United States Patent
Carsello

(10) Patent No.: US 12,335,082 B2
(45) Date of Patent: Jun. 17, 2025

(54) CORRELATOR BANK FOR PREAMBLE DETECTION

(71) Applicant: SR Technologies, Inc., Sunrise, FL (US)

(72) Inventor: Stephen R. Carsello, Plantation, FL (US)

(73) Assignee: SR Technologies, Inc., Sunrise, FL (US)

( * ) Notice: Subject to any disclaimer, the term of this patent is extended or adjusted under 35 U.S.C. 154(b) by 63 days.

(21) Appl. No.: 18/364,246

(22) Filed: Aug. 2, 2023

(65) Prior Publication Data

US 2024/0048428 A1 Feb. 8, 2024

Related U.S. Application Data

(60) Provisional application No. 63/394,699, filed on Aug. 3, 2022.

(51) Int. Cl.
*H04L 27/26* (2006.01)

(52) U.S. Cl.
CPC ...... *H04L 27/2663* (2013.01); *H04L 27/2665* (2013.01); *H04L 27/2666* (2013.01)

(58) Field of Classification Search
CPC ............. H04L 27/2663; H04L 27/2665; H04L 27/2666; H04L 27/2671; H04L 27/2657; H04L 27/2675

See application file for complete search history.

(56) References Cited

U.S. PATENT DOCUMENTS

| | | | | |
|---|---|---|---|---|
| 4,621,365 A | * | 11/1986 | Chiu | H04B 1/707 375/150 |
| 2005/0047530 A1 | * | 3/2005 | Lee | H04B 7/086 375/343 |

* cited by examiner

*Primary Examiner* — Vineeta S Panwalkar

(74) *Attorney, Agent, or Firm* — Goodwin Procter LLP

(57) ABSTRACT

A method for detecting a preamble waveform of a received signal is described. The method includes dividing a correlation into a plurality of sub-correlations, for a plurality of frequency offset indices, k, covering a range of frequency offsets. The correlation has a correlation length equal to N, and a plurality of sub-correlations has a sub-correlations quantity equal to I, each sub-correlation of the plurality of sub-correlations has a sub-correlation length equal to M. A complex oscillation for a template frequency offset associated with k is approximated, the approximation is to be constant over an M-sample interval and is a piece-wise approximation. The approximated complex oscillation has length I. A quantity I of sub-correlations at each k is assembled using the approximated complex oscillation of length I. The method further includes determining that the received signal comprises the preamble based on the assembled sub-correlations and a correlation threshold.

20 Claims, 13 Drawing Sheets

CORRELATOR BANK FOR PREAMBLE DETECTION

CROSS-REFERENCE TO RELATED APPLICATION

This application is related to and claims priority to U.S. Provisional Patent Application Ser. No. 63/394,699, filed Aug. 3, 2022, entitled GENERALIZED EFFICIENT CORRELATOR BANK FOR PREAMBLE DETECTION, the entirety of which is incorporated herein by reference.

TECHNICAL FIELD

The present disclosure relates to the detection of a generic, known preamble waveform in the presence of frequency offset. This disclosure may be used in the specific case of, but not limited to, orthogonal frequency division multiplex (OFDM) for Institute of Electrical and Electronics Engineers (IEEE) 802.11 wireless local area network (WLAN) devices.

BACKGROUND

Initially, it is noted that IEEE Standard 802.11-2020 is used as the base reference for disclosures used herein, the entire contents of which are incorporated herein by reference. The IEEE 802.11-2020 Standard is commonly referred to as "Wi-Fi" and is referred to as such herein. The IEEE 802.11-2020 Standard is also referred to herein as the "Standard". In particular, as a preferred embodiment of this disclosure, reference is made to Clause 17 OFDM commonly referred to as "IEEE 802.11a" or "Wi-Fi 11a".

Let s(t) be a known, complex preamble waveform spanning the time interval $t \in [0, T]$ and exhibiting energy $$\int_0^T |s(t)|^2 dt = T \quad (1)$$

Without loss of generality, for a channel exhibiting zero delay, the received preamble signal, r(t), may be expressed as:

$$r(t) = e^{j(2\pi ft + \theta)} s(t) + v(t) \quad (2)$$

Where f is the frequency offset in Hz,
θ is a phase offset in radians, and
v(t) is complex, additive white Gaussian noise (AWGN).

The normalized, complex correlation against the a priori preamble waveform is then:

$$\frac{1}{T}\int_0^T r(t) s^*(t) dt = \frac{1}{T} e^{j\theta} \int_0^T |s(t)|^2 e^{j2\pi ft} dt + \frac{1}{T}\int_0^T v(t) s^*(t) dt \quad (3)$$

The signal energy component of the normalized correlation as a function of frequency offset, $E_s(f)$, is:

$$E_s(f) = \left| \frac{1}{T}\int_0^T |s(t)|^2 e^{j2\pi ft} dt \right|^2 \quad (4)$$

For the case of a constant envelope preamble signal, where $|s(t)| = 1$ for all $t \in [0, T]$, $E_s(f)$ has the exact expression:

$$E_s(f) = \left| \frac{\sin(\pi fT)}{\pi fT} \right|^2 \quad (5)$$

FIG. 1 is a graphical representation 100 of $E_s(f)$ versus normalized frequency offset f for the case of a constant envelope preamble signal. At frequency offsets f=k/T, where k is a non-zero integer, i.e., f·T=−4, −3, −2,−1, 0, 1, 2, 3, 4, the signal energy component at the correlator output is zero, and as |f| increases, the signal component generally becomes smaller.

FIG. 2 is a graphical representation 200 of $E_s(f)$ for ten randomly generated, complex Gaussian preamble signals which satisfy the condition $B_1 T \gg 1$, where $B_1$ is the 1-sided bandwidth of the signal. The correlation's signal energy component versus normalized frequency offset for each of the ten different random examples shows the same general characteristic as shown in FIG. 1.

In a general sense, the duration of any preamble signal will be much greater than the inverse bandwidth of the signal. As such, it may be concluded that, for any preamble correlator, the signal energy component at the correlator output will start to degrade considerably for $|f| > \frac{1}{2}T$, with almost complete signal loss for $|f| > 1/T$.

For example, Wi-Fi devices compliant with Clause 17 OFDM may have maximum frequency offsets, ±20 parts per million (ppm), which, for channel frequency 5825 MHz at the upper end of the 5 GHz band, is a maximum allowable transmitter frequency error of ±116.5 kHz. The Clause 17 long preamble waveform has a 1-sided bandwidth $B_1$=8.125 MHz and duration T=8 µs, and hence, for correlation against the long preamble waveform, the first correlation null occurs at 1/T=125 kHz. Therefore, correlating against the Wi-Fi Clause 17 long preamble OFDM signal will produce almost zero signal energy at the worst-case frequency offset of 116.5 kHz.

General methods for detecting a known preamble waveform in the presence of frequency offset are known and are beyond the scope of the disclosure.

The generally known method for detection of a preamble with frequency offset is to autocorrelate the received signal where the received signal is crosscorrelated with a delayed version of the received signal. When the received signal consists only of noise, the output of the autocorrelation is zero-mean random variable. Such complex correlations require a large number of multiplications. Complex correlation requires computational complexity and a need for relatively large silicon areas due to the multiplication of complex numbers.

SUMMARY

According to one aspect, a method for detecting a preamble waveform of a received signal over a range of frequency offsets is described. The received signal includes a preamble having a preamble length (N) corresponding to the total number of complex samples in the preamble. The preamble includes a plurality of waveforms that has a quantity (I) of waveforms in a sequence, where each waveform has a quantity (M) of samples. The method includes dividing a correlation into a plurality of sub-correlations. The correlation is associated with the received signal and is for a plurality of frequency offset indices (k) covering the range of frequency offsets. The correlation has a correlation length equal to N, the plurality of sub-correlations has a sub-correlations quantity equal to I, and each sub-correlation of the plurality of sub-correlations has a sub-correlation length equal to M. The method further includes approximating a complex oscillation for a template frequency offset associated with k. The approximation is to be constant over an M-sample interval and is a piece-wise approximation.

The approximated complex oscillation has length I. The method also includes assembling a quantity I of sub-correlations at the plurality of frequency offsets indices (k) using the approximated complex oscillation of length I associated with k and determining that the received signal includes the preamble based on the assembled sub-correlations and a correlation threshold.

According to another aspect, a correlator apparatus configured for detecting a preamble waveform of a received signal over a range of frequency offsets is described. The received signal includes a preamble having a preamble length (N) corresponding to the total number of complex samples in the preamble. The preamble includes a plurality of waveforms that has a quantity (I) of waveforms in a sequence, where each waveform has a quantity (M) of samples. The correlator apparatus includes processing circuitry configured to divide a correlation into a plurality of sub-correlations. The correlation is associated with the received signal and is for a plurality of frequency offset indices (k) covering the range of frequency offsets. The correlation has a correlation length equal to N, the plurality of sub-correlations has a sub-correlations quantity equal to I, and each sub-correlation of the plurality of sub-correlations has a sub-correlation length equal to M. The processing circuitry is further configured to approximate a complex oscillation for a template frequency offset associated with k. The approximation is to be constant over an M-sample interval and is a piece-wise approximation. The approximated complex oscillation has length I. The processing circuitry is also configured to assemble a quantity I of sub-correlations at the plurality of frequency offsets indices (k) using the approximated complex oscillation of length I associated with k and determine that the received signal includes the preamble based on the assembled sub-correlations and a correlation threshold.

According to another aspect, a system comprising a correlator apparatus configured for detecting a preamble waveform of a received signal over a range of frequency offsets is described. The received signal includes a preamble having a preamble length (N) corresponding to the total number of complex samples in the preamble. The preamble includes a plurality of waveforms that has a quantity (I) of waveforms in a sequence, where each waveform has a quantity (M) of samples. The correlator apparatus includes processing circuitry configured to divide a correlation into a plurality of sub-correlations. The correlation is associated with the received signal and is for a plurality of frequency offset indices (k) covering the range of frequency offsets. The correlation has a correlation length equal to N, the plurality of sub-correlations has a sub-correlations quantity equal to I, and each sub-correlation of the plurality of sub-correlations has a sub-correlation length equal to M. The processing circuitry is further configured to determine, for a given sample rate, $f_s$, the sub-correlation length (M) based on a predetermined level of signal energy loss due to the piece-wise approximation and approximate a complex oscillation for a template frequency offset associated with k. The approximation is to be constant over an M-sample interval and is a piece-wise approximation. The approximated complex oscillation has length I. The processing circuitry is also configured to assemble a quantity I of sub-correlations at the plurality of frequency offsets indices (k) using the approximated complex oscillation of length I associated with k and determine that the received signal includes the preamble based on the assembled sub-correlations and a correlation threshold.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
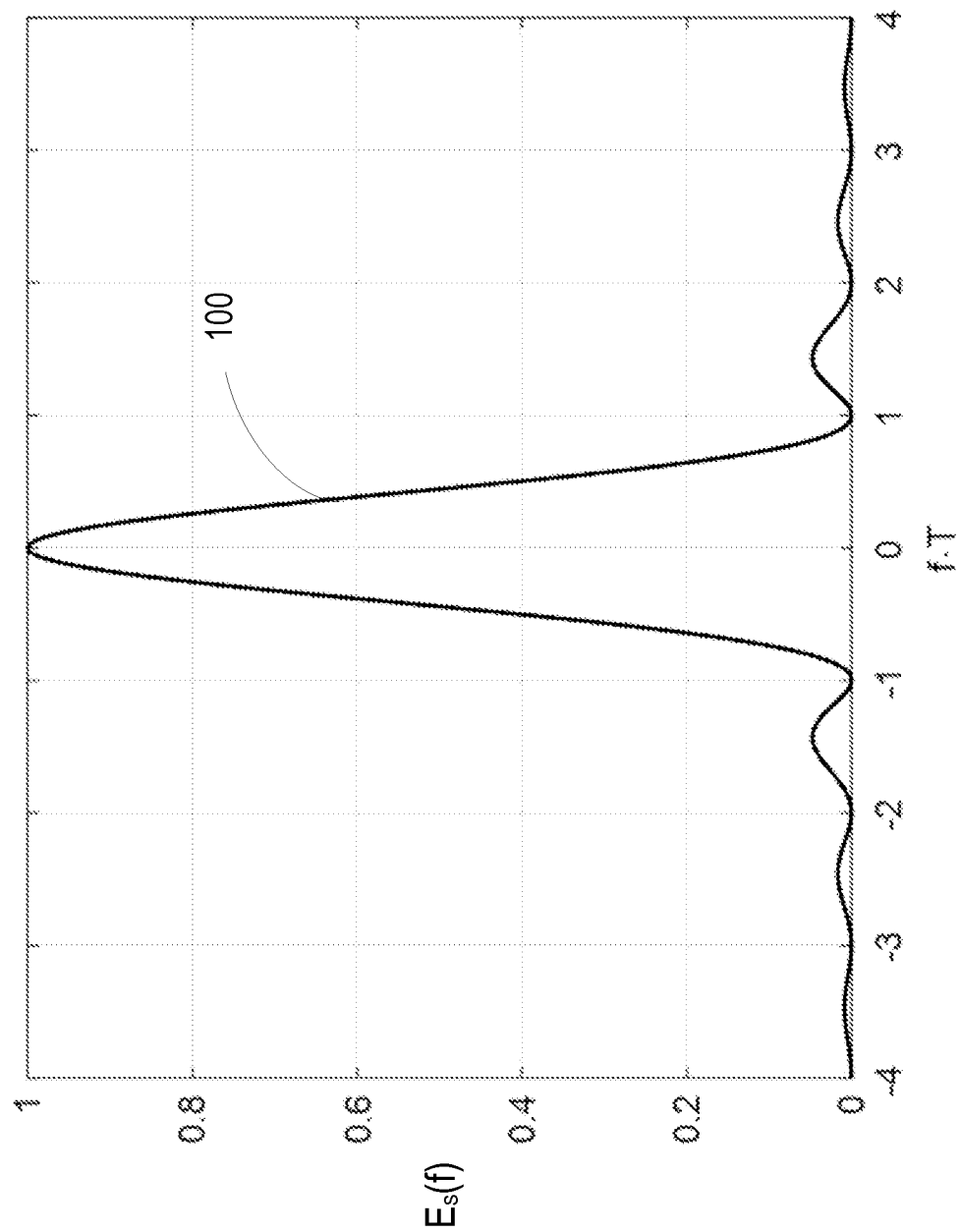
FIG. 1 is a graphical representation of $E_s(f)$ versus normalized frequency offset f for the case of a constant envelope preamble signal.
Figure 2:
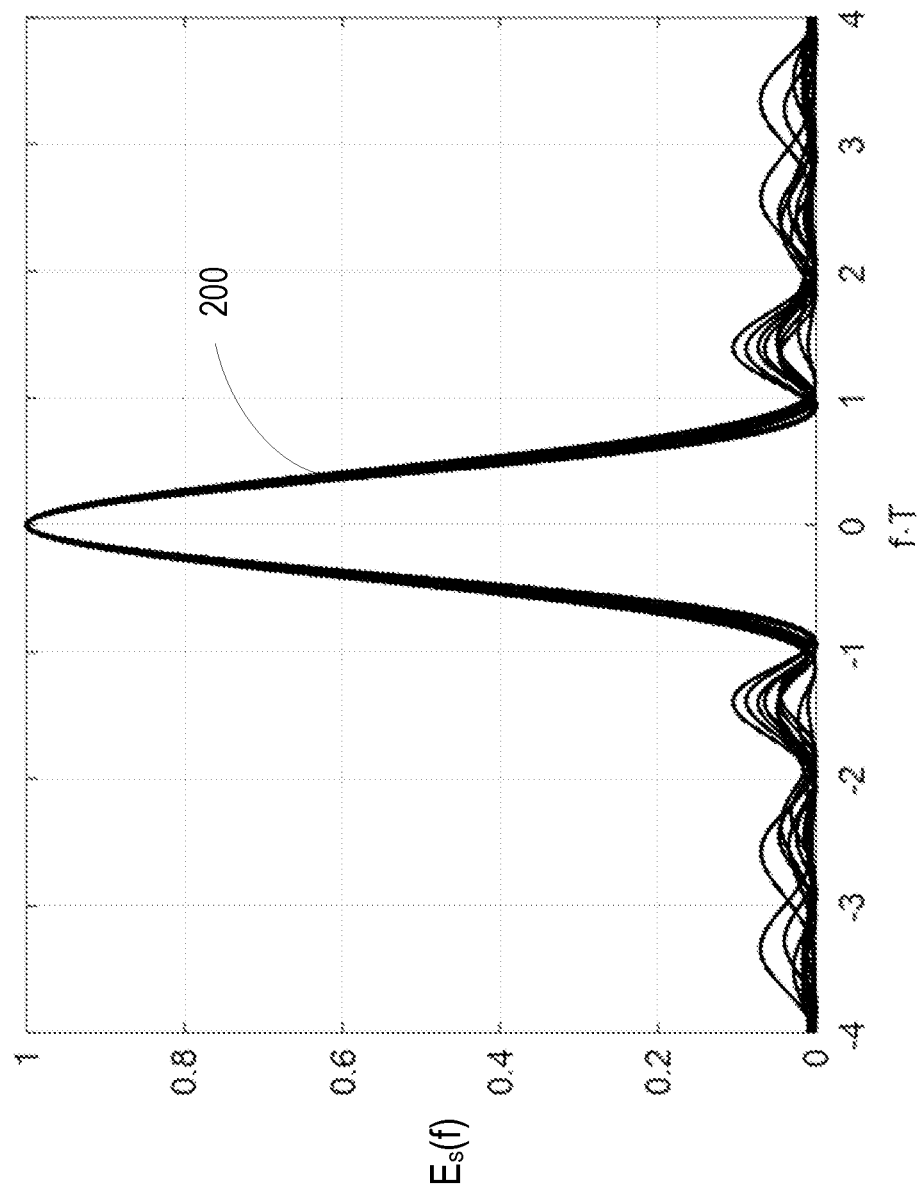
FIG. 2 is a graphical representation of $E_s(f)$ for ten randomly generated, complex Gaussian preamble signals which satisfy the condition $B_1 T \gg 1$, where $B_1$ is the 1-sided bandwidth of the signal.

In order to detect a received preamble signal over the entire range of possible frequency offsets, a bank of correlators may be used. The disclosed method and arrangements define a bank of correlators, e.g., for a case of any preamble signal satisfying the condition $B_1 T \gg 1$, where T is the duration and $B_1$ is the 1-sided bandwidth of the preamble signal. A piece-wise approximation of the correlation template offset oscillators is invoked so as to realize the complete correlator bank (e.g., for the cost of a single correlator), plus an additional, outer mixing and assembly stage. For the specific case of Wi-Fi Clause 17 OFDM, the periodic nature of the long preamble waveform may be exploited to achieve a viable correlator bank at an even lower complexity (e.g., and cost) than conventional correlators. For some cases, the complexity may be reduced even further by using a Fast Fourier Transform (FFT) for the outer mixing and assembly stage.

The disclosed method may be applied to the detection and synchronization of OFDM signals, e.g., in the Wi-Fi bands. The disclosed method significantly reduces the complexity of the required real-time complex correlations for the detection of an OFDM packet using the long training sequences of the Wi-Fi Clause 17 OFDM long preamble. Furthermore, the disclosed method eliminates the need to correlate the short training sequences of the short preamble.

A more complete understanding of the present disclosure, and the attendant advantages and features thereof, will be more readily understood by reference to the following detailed description.

Let $\{r_n\}$ be the complex, discrete-time received signal, and let $\{s_n\}$ be the length-N, complex, a priori preamble signal, also in discrete time. Each correlator of the bank is designed for a frequency offset index $k \in K$, where $K$ is the set of all frequency offset indices for the bank. The correlator output is then:

$$y_n^{(N,k)} = \sum_{m=0}^{N-1} \left[w_m^{(N,k)}\right]^* r_{n+m+1-N} \qquad (6)$$

where $\{w_m^{(N,k)}\}$ is the length-N complex correlation template for offset $k$, and $m$ is a summation index. For $n \in [0, N-1]$ $$w_n^{(N,k)} = e^{j2\pi f_k n/f_s} \cdot s_n \qquad (7)$$

where $f_k$ is the frequency offset, in Hz, associated with offset index $k$,
and $f_s$ is the sample rate in Hz.

In the general sense, the set of offsets $\{f_k\}$ may be chosen such that there is a uniform correlator bank, with:

$f_k = k \cdot \Delta$ $K: \{-K_1, 1-K_1, \ldots, -1, 0, 1, \ldots K_1-1, K_1\}$ For offset indices:
where $K_1$ is the maximum 1-sided offset index,
and $\Delta f$ is the frequency spacing between the correlators of the bank.

The spacing $\Delta f$ is set to satisfy the condition that any received frequency offset within range no greater than $f_s/2N$ from the closest frequency within the bank. Hence:

$$\Delta f \leq \frac{f_s}{N}.$$

Furthermore, to ensure that the maximum 1-sided offset $f_1$ will be within a distance no greater than $\Delta f/2$ from the maximum offset of the bank, the maximum 1-sided offset index $K_1$ may be determined as follows:

$$K_1 = \left\lceil \frac{f_1 - \Delta f/2}{\Delta f} \right\rceil = \left\lceil \frac{f_1}{\Delta f} - \frac{1}{2} \right\rceil \qquad (8)$$

For example, for the example of the Wi-Fi Clause 17 OFDM long preamble, as specified in the Standard, the following parameters apply: $f_s=20$ MHz, $N=160$, $f_1=116.5$ kHz. Hence, $f_s/N=125$ kHz. Setting $\Delta f=78125$ Hz, from equation (8):

$$K_1 = \left\lceil \frac{116500}{78125} - \frac{1}{2} \right\rceil = 1$$

Therefore, from equation (7), for $n \in [0,159]$ and $k \in \{-1, 0, +1\}$ $$w_n^{(160,k)} = e^{j\pi k n/128} \cdot s_n \qquad (9)$$

A length-N correlation may be divided into I sub-correlations, each of length M where $M=N/I$. The length-N template for frequency offset index $k=0$ can then be expressed in vector form as:

$$\vec{w}^{(N,0)} = [\vec{w}^{(M,0,1)} \vec{w}^{(M,0,2)} \ldots \vec{w}^{(M,0,I)}] \qquad (10)$$

Expressed another way, the length-N template may be simply divided into M, I-length sub-templates. The length-N correlation for template frequency offset index $k \in [-K, +K]$ may then be expressed as:

$$y_n^{(N,k)} = \sum_{m=0}^{N-1} \left[e^{j2\pi f_k m/f_s} \cdot w_m^{(N,0)}\right]^* r_{n+m+1-N} = \qquad (11)$$

$$\sum_{i=1}^{I} \sum_{m=0}^{M-1} \left\{e^{j2\pi f_k [iM+m-n_0]/f_s} \cdot w_m^{(M,0,i)}\right\}^* r_{n+(i-1)M+m+1-N}$$

Making the assumption that the complex oscillation associated with the template frequency offset (e.g., $e^{j2\pi f_k n/f_s}$ of equation (7)) is constant over an M-sample interval, i.e., for $m=0$ to $m=M-1$, then the following piece-wise approximation for the template frequency offset phasor sequence, may be made for all $k \in K$ and $m \in [0, M-1]$:

$$e^{j2\pi f_k (iM+m)/f_s} \approx e^{j2\pi f_k iM/f_s} \qquad (12)$$

Given sub-correlations for $i \in [0, I-1]$:

$$y_n^{(M,0,i)} = \sum_{m=0}^{M-1} \left[w_m^{(M,0,i)}\right]^* r_{n+m+1-M} \qquad (13)$$

equation (11) may be approximated for $k \in K$ as follows:

$$y_n^{(N,k)} \approx \sum_{i=0}^{I-1} e^{-j2\pi f_k iM/f_s} \sum_{m=0}^{M-1} \left[w_m^{(M,0,i)}\right] r_{n+iM+m+1-N} \approx \qquad (14)$$

$$\sum_{i=0}^{I-1} e^{-j2\pi f_k iM/f_s} \cdot y_{n-N[1-(i+1)/I]}^{(M,0,i)}$$

For the specific case when I is a power-of-2 with $\Delta f = f_s/N$, the assembled correlations, from equation (13), for $k \in [-K_1, +K_1]$, are:

$$y_n^{(N,k)} \approx \sum_{i=0}^{I-1} e^{-j2\pi k i/I} \cdot y_{n-N[1-(i+1)/I]}^{(M,0,i)} \qquad (15)$$

Figure 3:
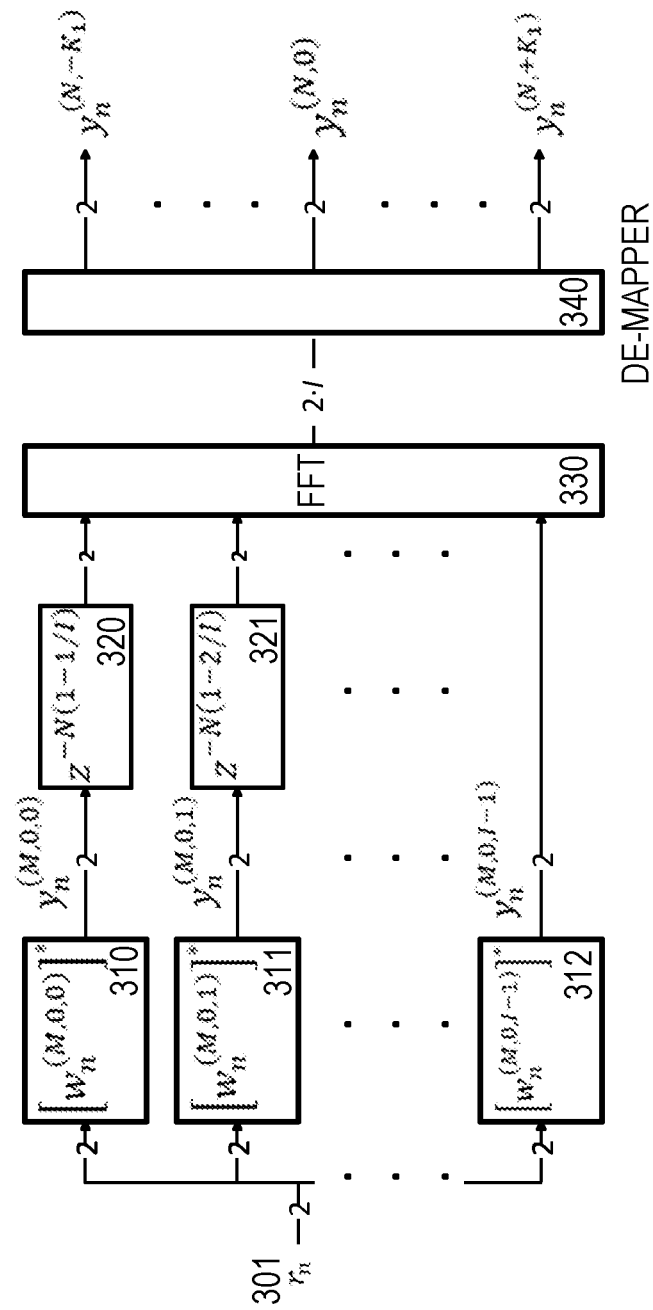
FIG. 3 is a block schematic diagram of a method for computing the assembled correlations as per equation (15) for $k \in [-K_1, +K_1]$.

FIG. 3 is a block schematic diagram of a method for computing the assembled correlations as per equation (15) for k∈[−K$_1$, +K$_1$]. A fast Fourier transform (FFT) 330, of length I, is used in conjunction with a frequency de-mapping function, de-mapper 340. The complex received input signal r$_n$ 301 is inputted to each of the I sub-correlators (i=0 to I−1). Referring to FIG. 3, sub-correlator 310 is for i=0, sub-correlator 311 is for i=1 and sub correlator 312 is for i=I−1. The output of sub-correlator 312 is input directly to the FFT 330. Each of the other sub-correlators is delayed by N(1−(i+1)/I, as per equation (15), before being inputted to the FFT 330. Hence, the output of sub-correlator 310 is delayed N(1−1/I) in delay 320, and the output of sub-correlator 311 is delayed N(1−2/I) in delay 321. The output of the FFT 330 is then input to the de-mapper 340 to produce the outputs $y_n^{(N,k)}$ for k∈[−K$_1$, +K$_1$].

Figure 4:
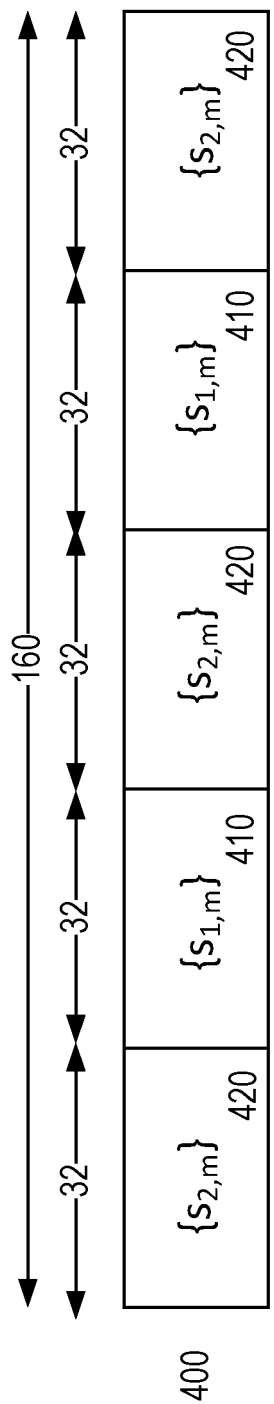
FIG. 4 is a diagram of the structure of the Wi-Fi Clause 17 OFDM long preamble.

FIG. 4 is a diagram of the structure of the Wi-Fi Clause 17 OFDM long preamble 400 as defined in the Standard. The long preamble 400 comprises, in sequence, waveform {s$_{2,m}$} 420, waveform {s$_{1,m}$} 410, waveform {s$_{2,m}$} 420, waveform {s$_{1,m}$} 410, and waveform {s$_{s,m}$} 420. For a 20 MHz sampling frequency, each of these two fundamental waveforms, {s$_{1,m}$} 410 and {s$_{2,m}$} 420 comprise length 32 complex samples.

An embodiment of this disclosure is for the detection of a Wi-Fi Clause 17 OFDM long preamble. As discussed above with reference to FIG. 4, the long preamble exhibits a periodic nature and comprises a total of 160 complex samples, N=160, a sequence of 5 waveforms, I=5, each waveform being 32 complex samples, M=32. As discussed above with reference to equations (8) and (9), for a sampling frequency fs=20 MHz, a frequency spacing Δf=78125 Hz is chosen.

Hence, as per equation (13), the correlator templates $w_m^{(M,0,i)}$ for the long preamble 400 are, for m=0, 1, ..., 31:

$$w_m^{(32,0,0)} = s_{2,m}$$

$$w_m^{(32,0,1)} = s_{1,m}$$

$$w_m^{(32,0,2)} = s_{2,m}$$

$$w_m^{(32,0,3)} = s_{1,m}$$

$$w_m^{(32,0,4)} = s_{2,m}$$

Hence, the piece-wise correlator only requires two length-32 correlators:

$$y_{1,n}^{(32,0)} = \sum_{m=0}^{31} [s_{1,m}]^* r_{n+m+1-32} \tag{16}$$

$$y_{2,n}^{(32,0)} = \sum_{m=0}^{31} [s_{2,m}]^* r_{n+m+1-32} \tag{17}$$

Then, with reference to equation (14), $$y_{n-160[1-1/5]}^{(32,0,0)} = y_{2,n-128}^{(32,k)}$$

$$y_{n-160[1-2/5]}^{(32,0,1)} = y_{1,n-96}^{(32,k)}$$

$$y_{n-160[1-3/5]}^{(32,0,2)} = y_{2,n-64}^{(32,k)}$$

$$y_{n-160[1-4/5]}^{(32,0,3)} = y_{1,n-32}^{(32,k)}$$

$$y_{n-160[1-5/5]}^{(32,0,4)} = y_{2,n}^{(32,k)}$$

Hence, the length−160 correlations may then be constructed as follows:

$$y_n^{(160,k)} \approx \sum_{i=0}^{4} e^{-j2\pi \cdot 78125k \cdot 32i/(20 \cdot 10^6)} \cdot y_{n-160[1-(i+1)/5]}^{(32,0,i)} \approx$$

$$\sum_{i=0}^{4} e^{-j\pi ki/4} \cdot y_{n-160[1-(i+1)/5]}^{(32,0,i)}$$

$$y_n^{(160,k)} \approx e^{-j\pi k} \cdot y_{2,n}^{(32,0)} + e^{-j3\pi k/4} \cdot y_{1,n-32}^{(32,0)} + \tag{18}$$

$$e^{-j\pi k/2} \cdot y_{2,n-64}^{(32,0)} + e^{-j\pi k/4} \cdot y_{1,n-96}^{(32,0)} + y_{2,n-128}^{(32,0)}$$

Figure 5:
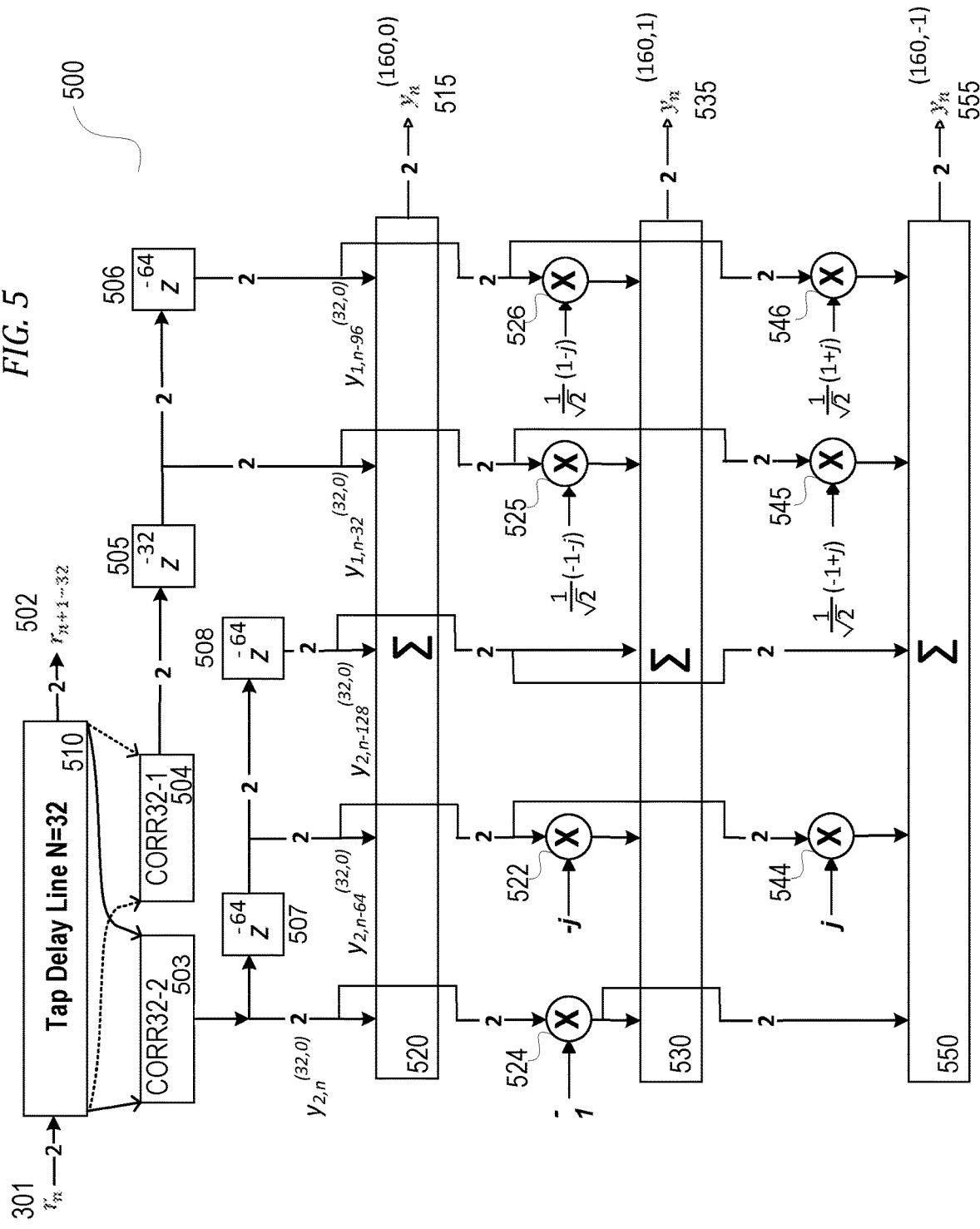
FIG. 5 is a block schematic diagram of an example of a complete correlation structure for a length-160, Wi-Fi Clause 17 OFDM long preamble correlator bank employing two length-32 sub-correlators for offset indices $k = -1, 0, 1$.

FIG. 5 is a block schematic diagram of an example of a complete correlation structure for a length−160, Wi-Fi Clause 17 OFDM long preamble correlator bank employing two length-32 sub-correlators, as per equation (18), for offset indices k=−1, 0, 1. Received complex signal r$_n$ 301 is inputted to a length-32 complex tap delay line 510 with output r$_{n+1-32}$ 502. The connections from the tapped delay line 510 to the correlator block 503, are for the sequence waveform {s$_{2,n}$} 420. The connections from the tapped delay line 510 to the correlator block 504, are for the sequence waveform {s$_{1,n}$} 410. The output from correlator block 503, corresponds to the first term in equation (18), for k=0, $y_{2,n}^{(32,0)}$, and is inputted to summation block 510. The output from correlator block 504 is delayed 32 samples in delay 505 and represents the second term in equation (18), for k=0, $y_{1,n-32}^{(32,0)}$, and is also inputted to summation block 520. The output from correlator block 503 is delayed by 64 samples in delay 507, representing the third term in equation (15) for k=0, $y_{2,n-64}^{(32,0)}$, and is inputted to summation block 520. The delayed output from delay 505 is further delayed by 64 samples in delay 506, representing the fourth term in equation (18) for k=0, $y_{1,n-96}^{(32,0)}$, and is inputted to summation block 520. The delayed output from delay 507 is further delayed by 64 samples in delay 508, representing the fifth term in equation (19) $y_{2,n-128}^{(32,0)}$, and is inputted to summation block 520. The five inputs to summation block 520 therefore are the five terms in equation (18) for k=0, and hence the output 515 of summation block 520 is $y_n^{(160,0)}$.

The first term in equation (18) for k=1 is $e^{-j\pi} \cdot y_{2,n}^{(32,0)} = -y_{2,n}^{(32,0)}$, hence the output from correlator block 503 is multiplied in multiplier 524 by −1 and is inputted to summation block 530. The second term in equation (18) for $$k = 1 \text{ is } e^{-j3\pi/4} \cdot y_{1,n-32}^{(32,0)} = \frac{1}{\sqrt{2}}(-1-j) \cdot y_{1,n-32}^{(32,0)},$$

hence the output from delay 505 is multiplied in multiplier 525 by $$\frac{1}{\sqrt{2}}(-1-j)$$

to represent the second term in equation (18) for k=1, and then inputted to summation block 530. The output from delay 507 is multiplied in multiplier 522 by −j to represent the third term in equation (18) for k=1, $-j \cdot y_{2,n-64}^{(32,0)}$ and then inputted to summation block 530. The output from delay 506 is multiplied in multiplier 526 by $$\frac{1}{\sqrt{2}}(1-j)$$

to represent the fourth term in equation (18) for $$k = 1, \frac{1}{\sqrt{2}}(1-j) \cdot y_{1,n-96}^{(32,0)},$$

and then inputted to summation block 530. The output from delay 508 represents the fifth term in equation (18) and is inputted to summation block 530. The five inputs to summation block 530 therefore are the five terms in equation (18) for k=1, and hence the output 535 of summation block 530 is $y_n^{(160,1)}$.

The output from multiplier 524, also corresponds to the first term in equation (18) for k=−1, $-y_{2,n}^{(32,1)}$, and is inputted to summation block 550. The second term in equation (19) for $$k = -1 \text{ is } e^{-j3\pi/4} \cdot y_{1,n-32}^{(32,0)} = \frac{1}{\sqrt{2}}(-1+j) \cdot y_{1,n-32}^{(32,0)},$$

hence the output from delay 505 is multiplied in multiplier 545 by $$\frac{1}{\sqrt{2}}(-1+j)$$

to represent the second term in equation (18) for k=−1, and then inputted to summation block 550. The third term in equation (18) for k=−1, $j \cdot y_{2,n-64}^{(32,0)}$ hence the output from delay 507 is multiplied in multiplier 544 by j and is inputted to summation block 550. The output from delay 506 is multiplied in multiplier 546 by $$\frac{1}{\sqrt{2}}(1+j)$$

to represent the fourth term in equation (18) for $$k = -1, \frac{1}{\sqrt{2}}(1+j) \cdot y_{1,n-96}^{(32,0)},$$

and then inputted to summation block 550. The output from delay 508 represents the fifth term in equation (18) and is inputted to summation block 550. The five inputs to summation block 550 therefore are the five terms in equation (18) for k=−1, and hence the output 555 of summation block 550 is $y_n^{(160,-1)}$.

The approximation may be evaluated analytically, in a tractable form, as follows.

The preamble waveform $\{s_n\}$ and the corresponding sub-templates $\{w_m^{(M,0,i)}\}$ may be assumed to be complex with constant envelope and the signal is received with a frequency offset f. If the preamble is received such that it is perfectly aligned in time with the template at sample time $n_0$, then the signal component for assembling the sub-correlator output $i \in [0, I−1]$ is $$y_{n_0-N[1-(i+1)/I]}^{(M,0,i)} = \sum_{m=0}^{M-1} e^{j2\pi f\{n_0-N[1-(i+1)/I]+m+1-M\}/f_s} = \quad (19)$$

$$e^{j\theta} e^{j2\pi f i M/f_s} \sum_{m=0}^{M-1} e^{j2\pi fm/f_s} = e^{j\theta} e^{j2\pi f i M/f_s} \cdot \frac{\sin(\pi M f/f_s)}{\sin(\pi f/f_s)}$$

Where any terms not dependent on i or m are progressively lumped into a constant phase offset θ.

Then, the signal component of the assembled correlator output for offset index k, is:

$$S(f, k) = \quad (20)$$

$$\sum_{i=0}^{I-1} e^{-j2\pi f_k iM/f_s} \cdot y_{n_0-N[1-(i+1)/I]}^{(M,0,i)} = e^{j\theta} \cdot \frac{\sin(\pi M f/f_s)}{\sin(\pi f/f_s)} \cdot \sum_{i=0}^{I-1} e^{j2\pi(f-f_k)iM/f_s} =$$

$$e^{j\theta} \cdot \frac{\sin(\pi M f/f_s)}{\sin(\pi f/f_s)} \cdot \frac{\sin[\pi IM(f-f_k)/f_s]}{\sin[\pi M(f-f_k)/f_s]}$$

For a given received frequency offset f, to evaluate the signal loss due solely to the piece-wise approximation, at the correlator bank offset closest to the received frequency offset, the offset index k may be eliminated by defining $$\Delta_{min}(f) = \min_{k \in K} (|f-f_k|)$$

Which, in the case of a uniform filter bank, is $$\Delta_{min}(f) = |f| - \Delta f \left\lfloor \frac{|f|}{\Delta f} + \frac{1}{2} \right\rfloor$$

The signal power of the assembled correlator output is then $$P_s(f) = \left\{ \frac{\sin(\pi M f/f_s)}{\sin(\pi f/f_s)} \cdot \frac{\sin[\pi N \Delta_{min}(f)/f_s]}{\sin[\pi M \Delta_{min}(f)/f_s]} \right\}^2$$

The resulting relative power gain between the approximated and non-approximated correlation for frequency offset f is then:

$$G(f) = \frac{P_s(f)}{P_0(f)} = \left\{ \frac{\sin(\pi M f/f_s)}{\sin(\pi f/f_s)} \cdot \frac{\sin[\pi \Delta_{min}(f)/f_s]}{\sin[\pi M \Delta_{min}(f)/f_s]} \right\}^2 = \frac{G_1(f)}{G_2(f)} \quad (21)$$

Equation (21) is the ratio of two discrete time sinc functions where $G_1(f)$ is the primary term and $G_2(f)$ serves to direct the solution toward the closest frequency bin. To ensure an acceptable piece-wise approximation, the sub-correlator segment length M and hence the number of segments I may be selected such that:

$$-10 \log_{10}[G(f_1)] \leq \Delta_{dB}$$

where $\Delta_{dB}$ may be an acceptable level for the worst-case signal loss due to the piece-wise approximation, for example 1 dB.

As an example, for one embodiment of this disclosure, the detection of a Wi-Fi Clause 17 OFDM long preamble, as discussed above with reference to FIG. 4, $$\Delta_{min}(f_1) = f_1 - f_0 = 78125 = 38375 \text{ Hz}$$

Therefore, the worst-case signal loss, due to the approximation, equation (21) is $$-10\log_{10}[G(f_1)] =$$

$$10\log_{10}\left[\frac{\sin(\pi \cdot 32 \cdot 116500/20 \cdot 10^6)}{\sin(\pi \cdot 116500/20 \cdot 10^6)} \cdot \frac{\sin[\pi \cdot 38375/20 \cdot 10^6]}{\sin[\pi \cdot 32 \cdot 38375/20 \cdot 10^6]}\right]^2 =$$

0.448 dB

The estimated loss due to the approximation is less than 0.5 dB which may be considered a beneficial trade-off for the significant reduction in computational complexity.

To declare that a packet has been successfully detected, a correlation peak above a preset correlation level must occur on at least one of the three summation outputs, 515, 535, and 555. The preset correlation level may be determined several ways including measurements and calculations. An example of a method to determine the threshold correlation by calculation, is to define a normalized sync-hit test for each of the summation outputs, 515, 535, and 555 as follows:

$$\text{SYNC\_HIT}_n^{(N,k)} = \begin{cases} 1 & |y_n^{(N,k)}|^2 \geq \eta \cdot e_n \\ 0 & |y_n^{(N,k)}|^2 < \eta \cdot e_n \end{cases}$$

$$\eta\{e_n\}e_n = E_w \cdot \sum_{m=0}^{N-1} |r_{n+m+1-160}|^2$$

Where is the normalized preamble detection threshold, and is the normalized energy signal
$\eta\{e_n\}$
With constant scalar $$E_w = \sum_{i=0}^{I-1} \sum_{m=0}^{M-1} |w_m^{(N,0,i)}|^2$$

A preamble is said to have been successfully detected if a sync hit and correlation peak occur on at least one of the $1+2K_1$ correlator outputs, coinciding with the preamble time-of-arrival.

Figure 6:
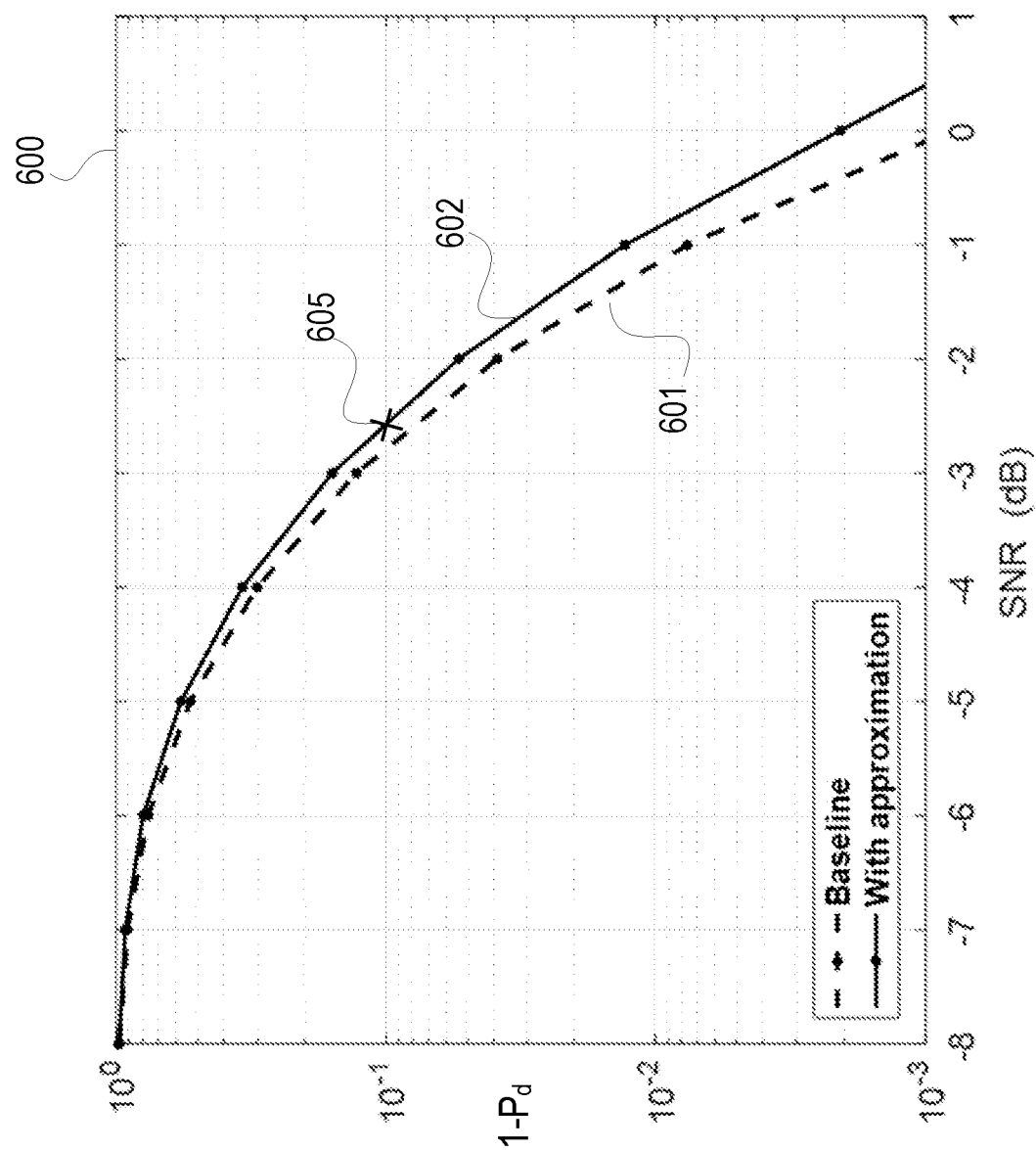
FIG. 6 is a graph of an example of the performance curves showing the probability of missed long preamble detection $1-P_d$ versus signal to noise ratio (SNR) for the preferred embodiment of the Wi-Fi Clause 17 OFDM long preamble correlator in an additive White Gaussian noise (AWGN) channel.

FIG. 6 is a graph 600 of an example of the performance curves showing the probability of missed long preamble detection $1P_d$ versus signal to noise ratio SNR for the preferred embodiment of the Wi-Fi Clause 17 OFDM long preamble correlator in an additive White Gaussian noise, AWGN, channel. Plot 601 is the simulated performance of the baseline correlator bank without the piece-wise approximation, and plot 602 is the simulated performance of the simplified correlator structure 500 with piece-wise approximation. For each simulation trial, the packet time-of-arrival and frequency offset were randomized, and 100,000 independent trials were evaluated for each simulation point using a preferred normalized threshold setting $\eta=0.15625$. For an AWGN channel the preamble detection, $P_d$, is 90% for SNR=−2.6 dB, 605, i.e., a 10% packet detection error rate. The performance loss due to the piece-wise approximation is in the order of only 0.25 dB which may be considered a negligible loss especially for the significant reduction in computational complexity. This sensitivity is well in line with the performance of a typical OFDM payload demodulator and decoder.

In another non-specific embodiment of this disclosure, a preamble of length N=128 is considered with uniform correlator bank having frequency spacing $\Delta f=f_s/N$. The number of sub-correlations I is assumed to be a power-of-2, such that when invoking the piece-wise approximation, the correlator bank may employ a length-I FFT for assembling the I sub-correlations, as discussed above with reference to FIG. 3. For each simulation trial, a length-128 complex Gaussian preamble waveform is randomly generated, and is received at a random frequency offset within the range $[-f_1, +f_1]$, with, for this example:

$K_1 1=3$ $f_1=3.5 \cdot \Delta f$

Figure 7:
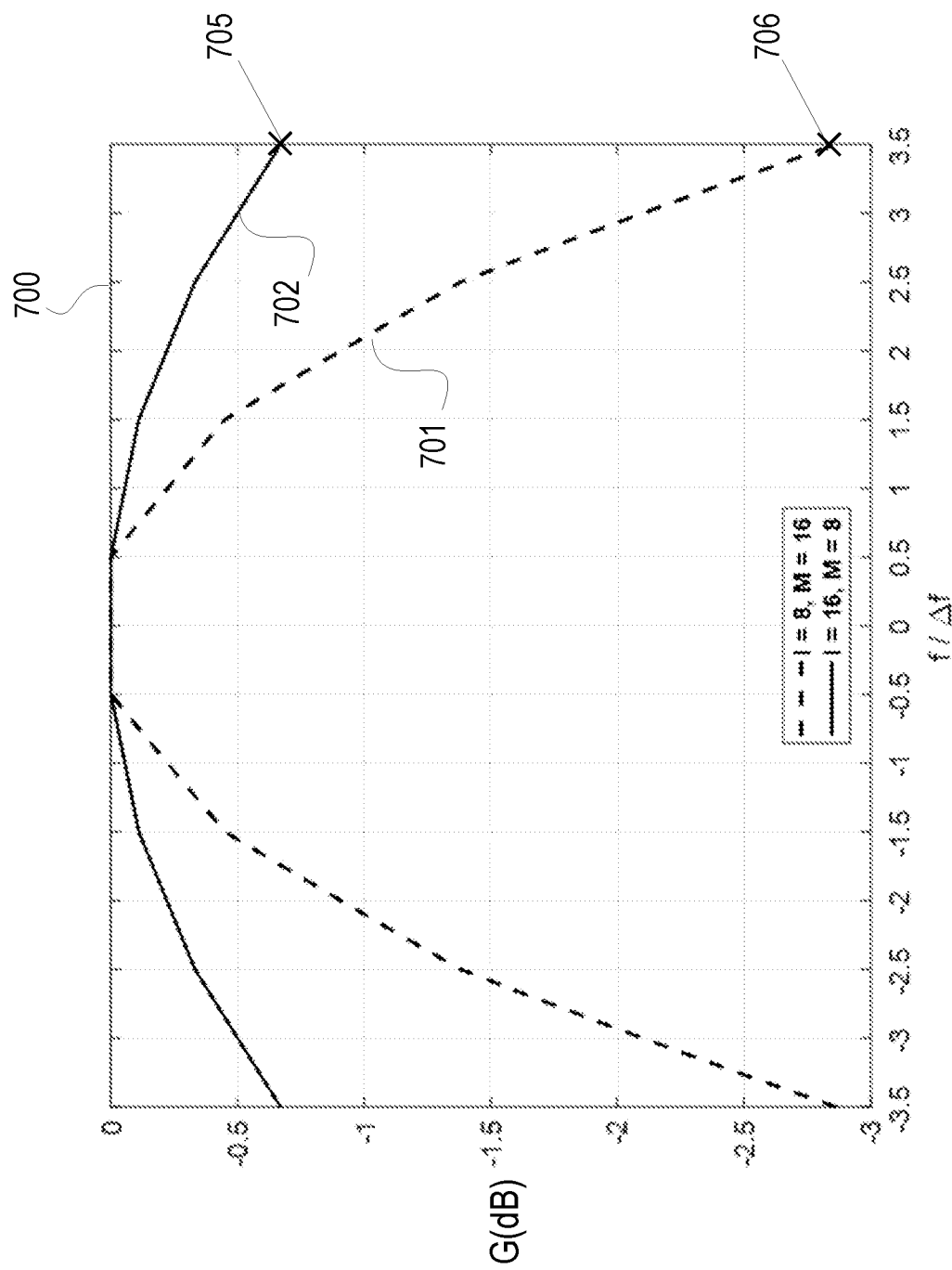
FIG. 7 is a graph of an example of the relative signal gain for the piece-wise approximated correlator bank compared to that of the non-approximated correlator bank against frequency offset, f, normalized by the spacing $\Delta f$, for I=8, and I=16.

FIG. 7 is a graph 700 of an example of the relative signal gain for the piece-wise approximated correlator bank compared to that of the non-approximated correlator bank against frequency offset, f, normalized by the spacing $\Delta f$, for I=8, plot 701, and I=16, plot 702. The signal loss at worst case offset f1, i.e., $f_1/\Delta f=\pm 3.5$, for plot 701, I=8, is almost 3 dB 706, whereas the worse-case loss for plot 702, I=16, is about 0.7 dB 705.

Figure 8:
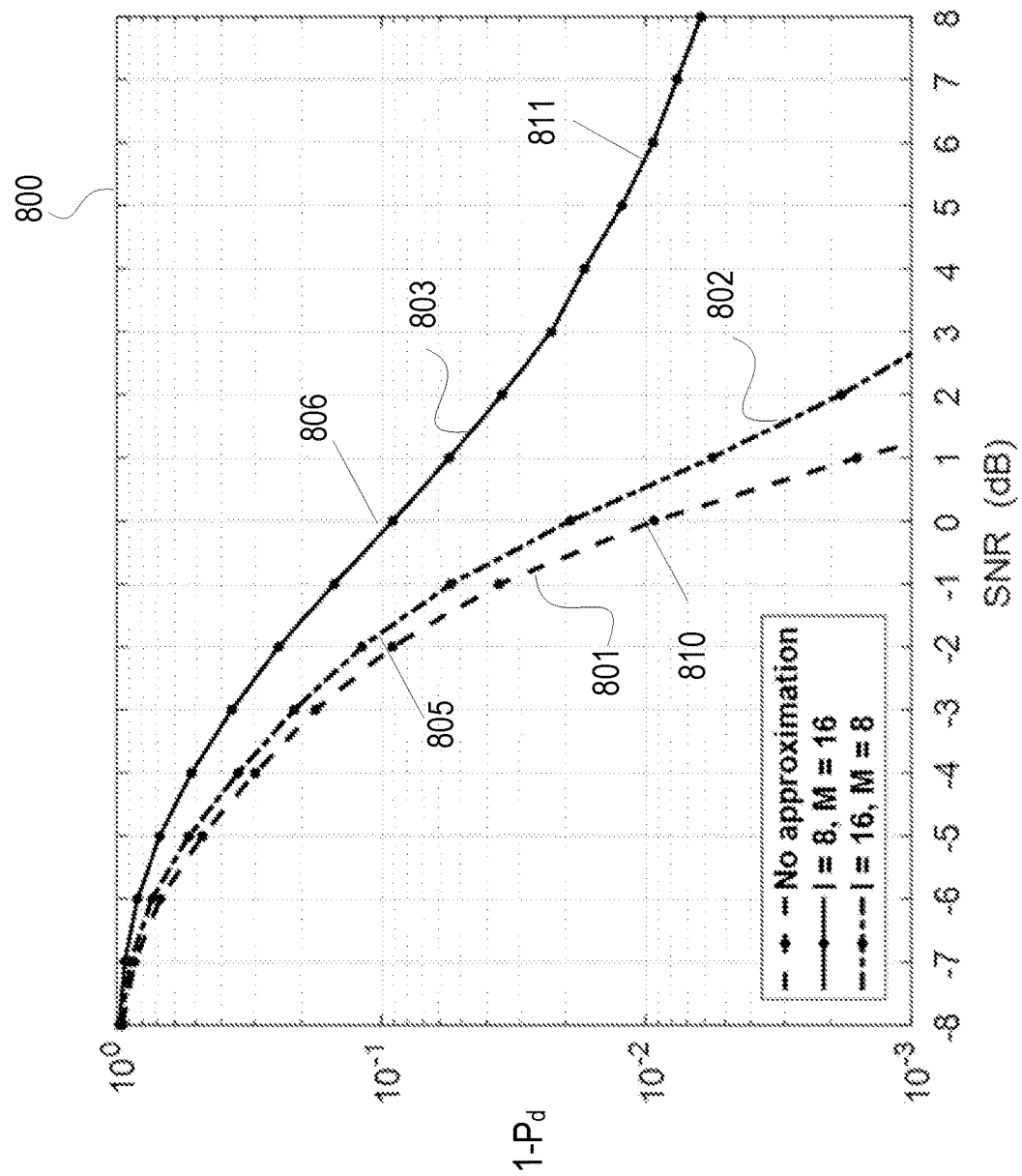
FIG. 8 is a graph of an example of the performance curves showing the probability of missed long preamble detection $1-P_d$ versus signal to noise ratio SNR in an AWGN channel for the non-specific embodiment of this disclosure for each of the two configurations I=8 and I=16, using a normalized sync-hit threshold of $\eta = 0.1875$.

FIG. 8 is a graph 800 of an example of the performance curves showing the probability of missed long preamble detection $1-P_d$ versus signal to noise ratio SNR in an AWGN channel for the non-specific embodiment of this disclosure for each of the two configurations I=8 and I=16, using a normalized sync-hit threshold of $\eta=0.1875$. Plot 801 is the performance for the non-approximated correlator bank, plot 802 is the performance for the piece-wise approximated correlator bank for I=16, and plot 803 is the performance for the piece-wise approximated correlator bank for I=8. The performance degradation at 10% PER for I=16, plot 802, is in the order of 0.2 dB 805 compared to plot 801, whereas the performance degradation for I=8, plot 803 is in the order of 2 dB 806. The performance degradation at 1% PER for I=16, plot 802, is in the order of 0.5 dB 805 compared to plot 801, whereas the performance degradation for I=8, plot 803 is in the order of 6 dB 811.

Hence, for any preamble waveform of factorable length N, and received with maximum 1-sided frequency offset $f_1$, the length-N correlation may be sub-divided into I length-M sub-correlations. The I sub-correlations may then be assembled into a bank of approximated length-N correlations. There is only an incremental worst-case signal loss, provided that the analytical expression for the relative signal loss $-10 \log_{10}[G(f_1)]$, due to the piece-wise approximation, is within a tolerable level. As may be expected, and as demonstrated by comparison of plots 803 and 802, the higher the value for I the shorter are the resulting length-M sub-correlations and hence the better the approximation that the template frequency offset is constant over the M-sample interval, i.e., for m=0 to m=M−1, as discussed above with reference to equation (12).

Figure 9:
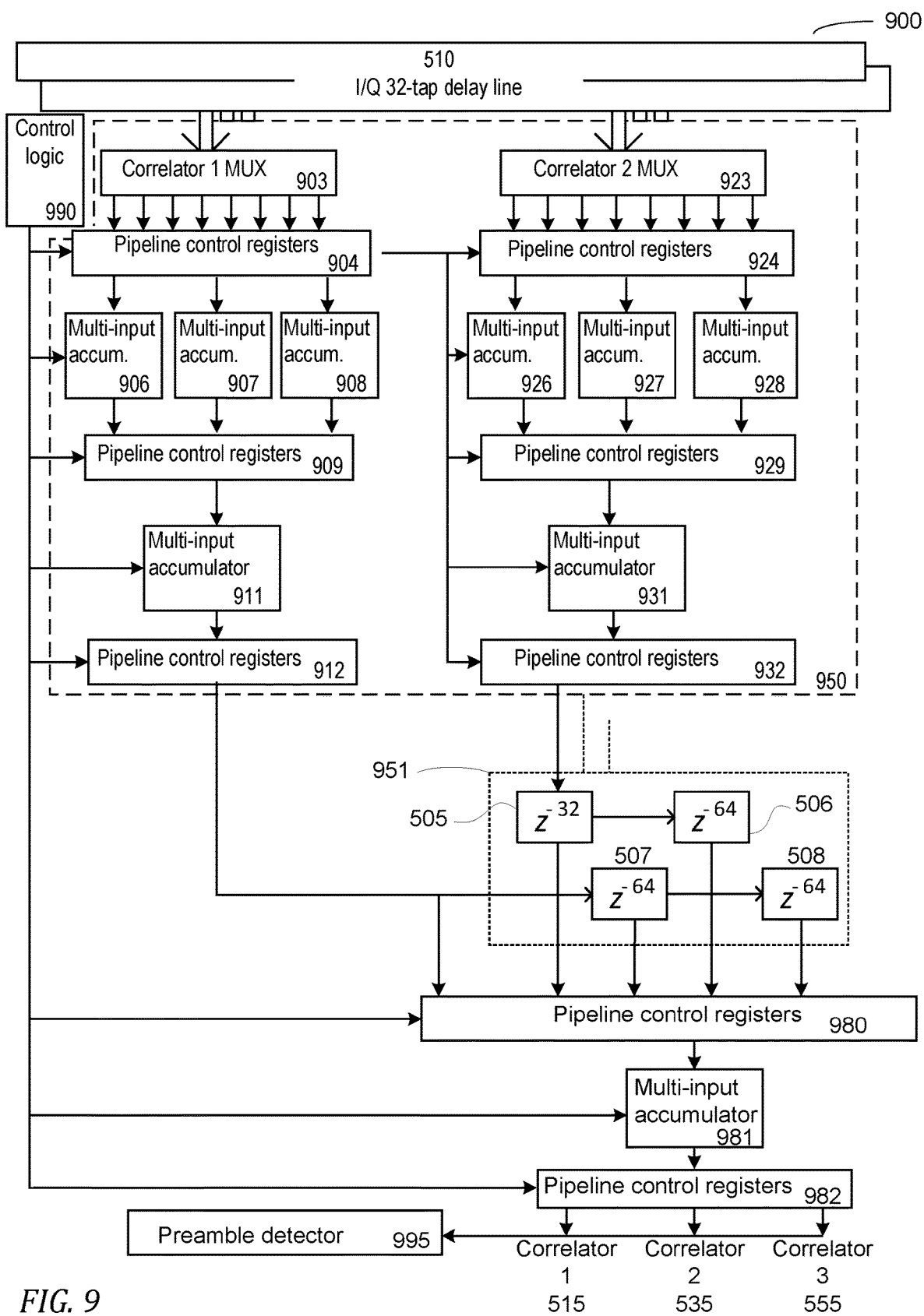
FIG. 9 is a schematic diagram of an example correlator apparatus that may be used to implement an OFDM preamble correlator.

FIG. 9 is a schematic diagram of an example correlator apparatus 900 that may be used to implement an OFDM preamble correlator as discussed above with reference to FIG. 5. The example correlator apparatus 900 comprises a 32-tap complex (I/Q) delay line 510, control logic 990, a correlator block 950, a delay block 951, pipeline control registers 980, a multi-input accumulator 981 and pipeline control registers 982.

The 32-tap delay line 510 comprises two delay lines, one for the in-phase components, I, of the received bit stream, and the other for the quadrature components, Q.

Correlator block 950 performs the functions as discussed above with reference to FIG. 5, correlator blocks 503 and 504, as discussed above with reference to equation (18), corresponding to the correlation for k=0. Correlator block 950 includes a correlator 1 903 followed by three multi-input accumulators 906, 907 and 908 and multi-input accumulator 911. In addition, there are pipeline control registers 904, 909 and 912 controlling the data selections between the correlator 1 903, the three multi-input accumulators (906, 907, 908), and after the multi-input accumulator 911. correlator block 950 also includes a correlator 2, 923, followed by three multi-input accumulators 926, 927 and 928 and multi-input accumulator 931. Similarly, there are pipeline control registers 924, 929 and 932 controlling the data selections between the correlator 2 923, the three multi-input accumulators (926, 927, 928), and after the multi-input accumulator 931.

As an example, correlator block 950 Taps from the I/Q 32-tap delay line 901 are connected to correlator 1 903 which is connected via pipeline control registers 904 to 3 input accumulators 906, 907 and 908. Each component from correlator 1 903 is chosen from the I and Q value in the delay line 901 at different clock cycles as controlled by the control logic 990 and the pipeline control registers 904. Similarly, taps from the delay line 901 are connected to correlator 2 923 which is connected via pipeline control registers 924 to 3 input accumulators 926, 927 and 928. Each component from correlator 2 923 is chosen from the I and Q value in the delay line 901 at different clock cycles as controlled by the control logic 990 and the pipeline control registers 924. The three multi-input accumulators 906, 907, 908 and 926, 927, 928 may also perform summation and phase adjustment functions as required for the correlation and are controlled by the pipeline control registers 904 and 924 respectively. The three multi-input accumulators 906, 907, 908 are connected, via pipeline control registers 909 to the multi-input accumulator 911. The three multi-input accumulators 926, 927, 928 are connected, via pipeline control registers 929 to the multi-input accumulator 931. The pipeline control registers 912 and 932 are connected to the sample delay 507 and 505 respectively in the delay block 951. The delay block 951 comprises a 32-sample delay 505 and three 64 sample delays 506, 507 and 508 performing the functions as discussed above with reference to FIG. 5.

The outputs from the delays in delay block 951 are connected to pipeline control registers 980 which controls the outputs from the delay block into multi-input accumulator 981 which performs the functions as discussed above with reference to FIG. 5, namely multipliers 522, 524, 525, 526 and 544, 545, 546. The multi-input accumulator 981 results are inputted to pipeline control registers 982 which provides the three correlator outputs $y_n^{(160,0)}$ 515, $y_n^{(160,1)}$ 535, and $y_n^{(160,-1)}$ 555. Preamble detector 995 determines if a correlation peak above a preset level has occurred on at least one of the three correlator outputs, 515, 535 or 555 in order to declare that a preamble has been detected.

In some embodiments, the correlator apparatus 900 may comprise one or more processors and/or processor cores and/or FPGAs (Field Programmable Gate Array) and/or ASICs (Application Specific Integrated Circuitry) configured to execute the described functions. In other words, the functions performed by correlator apparatus 900 may be performed by any suitable hardware processing element.

Figure 10:
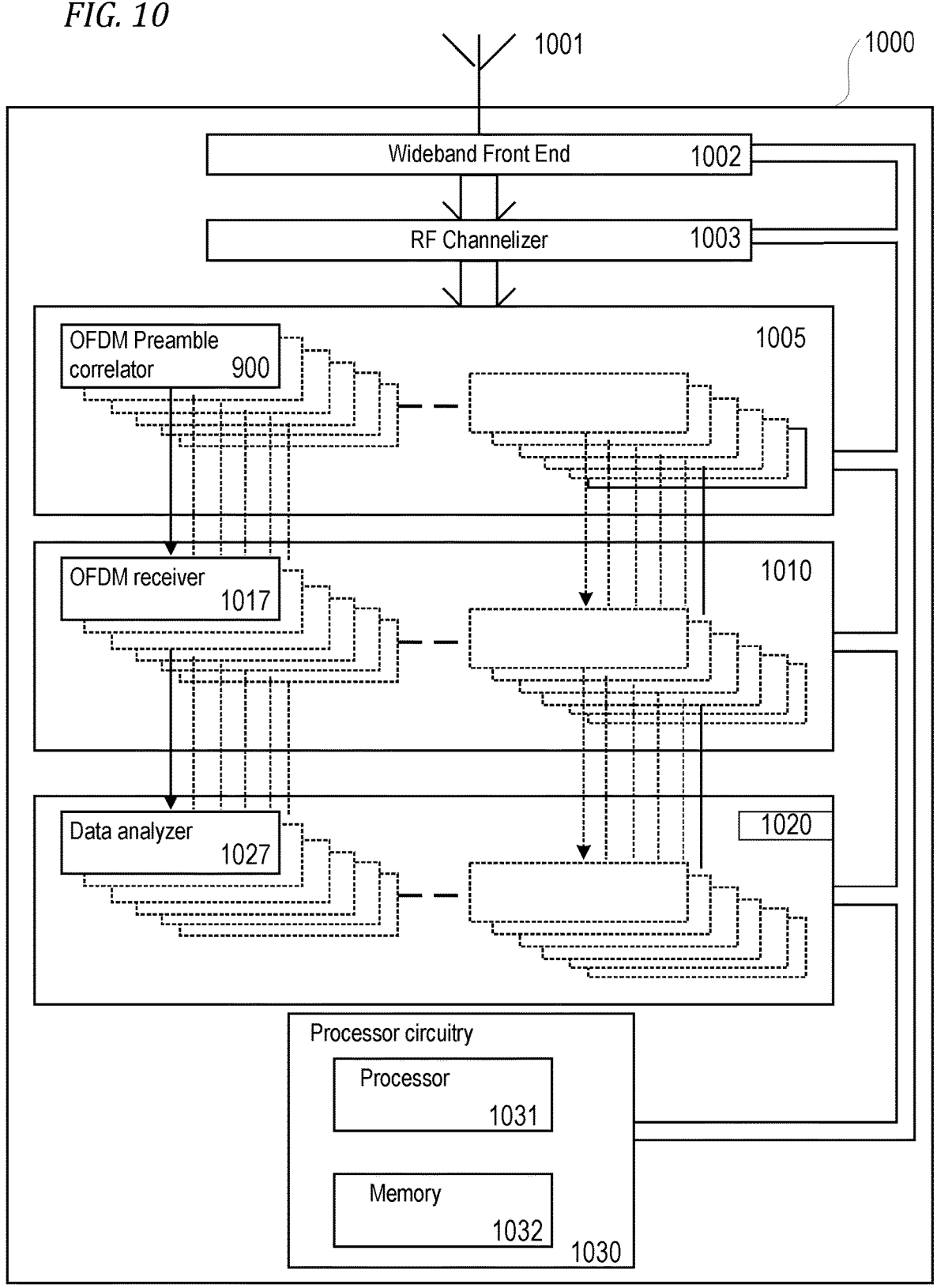
FIG. 10 is a block diagram of an example of a network traffic analyzer that may be used to monitor Wi-Fi Clause 17 OFDM signals across a wide band.

FIG. 10 is a block diagram of an example of a network traffic analyzer 1000 that may be used to monitor Wi-Fi Clause 17 OFDM signals across a wide band. For example, such a network traffic analyzer 1000 may be used to monitor OFDM traffic over the entire 5 GHz band used by Wi-Fi. In some embodiments the network traffic analyzer 1000 includes an antenna 1001, a wideband front end 1002, an RF channelizer 1003, a block (1005) of OFDM preamble correlators 900, a block of OFDM receivers 1017, a block of data analyzers 1027, and processing circuitry 1030. The wideband front end 1002 may perform the usual functions of an RF front end such as low noise amplification, filtering, and I/Q frequency down conversion so as to condition the received signal for inputting to the RF channelizer 1003. The RF channelizer 1003 may perform the function of filtering the wideband received signal into discrete channels. For example, if the wideband front end 1002 detects signals across the 5 GHz band (5160 to 5885 MHz) there are 31 20 MHz Wi-Fi channels. The individual channel I/Q data streams may be inputted to an individual OFDM preamble correlator 1007 in the block of OFDM preamble correlators 1005. Each individual OFDM preamble correlator in the block of OFDM correlators 1005 may be as described above with reference to FIG. 9, i.e., correlator apparatus 900. If an OFDM signal is detected by the OFDM preamble correlator 1007, then the received data stream may be inputted to an OFDM receiver 1017 in the block of OFDM receivers 1010. Each OFDM receiver 1017 may perform the Wi-Fi OFDM functions of I/Q demodulation, guard interval removal, FFT (fast Fourier transform), pilot removal, de-interleaving, de-mapping, decoding, and descrambling and demodulating to condition the received signal suitable for inputting to a for data analysis in a data analyzer 1027 in the block of data analyzers 1020. Similarly, each OFDM preamble correlator 900 in block 1005 is connected to an OFDM receiver 1017 in block 1010 which, in turn, is connected to a data analyzer 1027 in block 1020. Although shown in FIG. 10 as a number of discrete data analyzers 1027 in data analyzer block 1020, the function of the block 1020 of data analyzers may be performed by one or more processors and/or processor cores and/or FPGAs.

In some embodiments the wideband front end 1002, the RF channelizer 1003 and the OFDM receivers, e.g., 1017, and/or the processing circuitry 1030 may comprise a processor 1031, integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments some or all of the functions of the wideband front end 1002, the RF channelizer 1003 and the OFDM receivers, e.g., 1027, may be performed by the processing circuitry 1030. The processing circuitry 1030 may be configured to control any of the methods and/or processes described herein and/or to cause such methods, and/or processes to be performed. The memory module 1032 is configured to store data, programmatic software code and/or other information described herein. In some embodiments, the software may include instructions that, when executed by the processing circuitry 1030, causes the processing circuitry 1030 to perform the processes described herein with respect to the network traffic analyzer 1000.

It may be noted that in such a wideband network traffic analyzer 1000, where the traffic is analyzed across a significant number of channels, a relatively large number of OFDM preamble correlators 1007 are needed, for example 31. A low complexity OFDM preamble correlator 1007, as discussed above with reference to FIG. 9, is therefore advantageous in that it represents a significant saving in related implementation size and costs to a conventional OFDM preamble detector that involves multiplication stages. The disclosed method results in a low complexity long preamble correlator as discussed above with reference to FIG. 5 for Wi-Fi Clause 17 OFDM packets.

Figure 11:
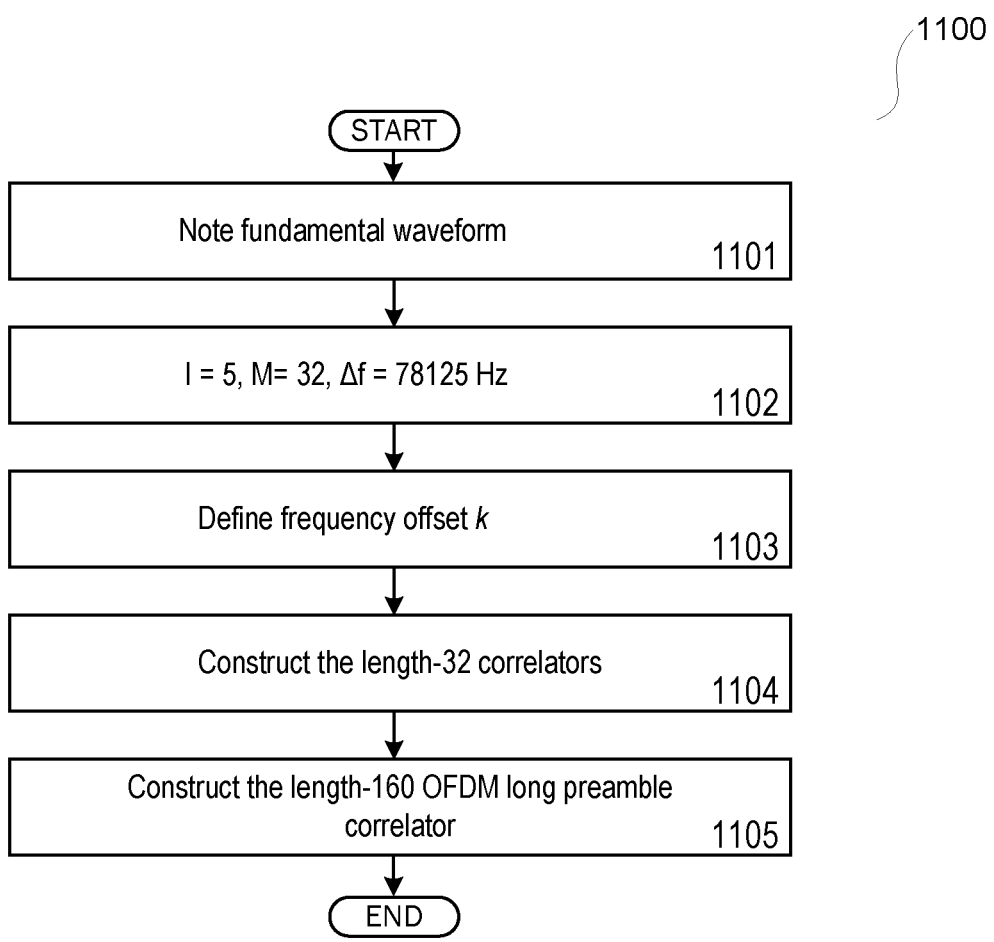
FIG. 11 is a flowchart of the steps of an example method to construct the disclosed preferred embodiment of this disclosure, the detection of a Wi-Fi Clause 17 OFDM long preamble correlator.

FIG. 11 is a flowchart 1100 of the steps of an example method to construct the disclosed preferred embodiment of this disclosure, the detection of a Wi-Fi Clause 17 OFDM long preamble correlator. The method may start at step 1101 where it is noted that the long preamble comprises two length-32 fundamental waveforms. As discussed above with reference to FIG. 4, the long preamble may be represented by two fundamental waveforms, $\{s_{1,n}\}$ 410 and $\{s_{2,n}\}$ 420 and the complete length-160 long preamble comprises the sequence, $\{s_{2,n}\}\{s_{1,n}\}\{s_{2,n}\}\{s_{1,n}\}\{s_{2,n}\}$. The length −160 preamble symbols are provided in Table I-6 in the Standard. At step 1102, it is noted that the long preamble exhibits a periodic nature and comprises a total of 160 complex samples, N=160, a sequence of 5 waveforms, I=5, each waveform being 32 complex samples, M=32. As discussed above with reference to equations (8) and (9), for a sampling frequency fs=20 MHz, a frequency spacing Δf=78125 Hz is chosen, and a frequency offset index k is defined at step 1103. At step 1104 the piece-wise correlator may be constructed from the two length-32 correlators as discussed above with reference to equations (16) and (17).

At step 1105 as discussed above with reference to equations (14), (18), and FIG. 5, a length-160 correlator $y_n^{(160,k)}$ may be constructed by assembling the outputs of the length-32 correlator using delays and phasors as discussed above with reference to FIG. 5, to produce an efficient OFDM preamble detection correlator that may be realized by circuitry as discussed above with reference to FIG. 9.

Figure 12:
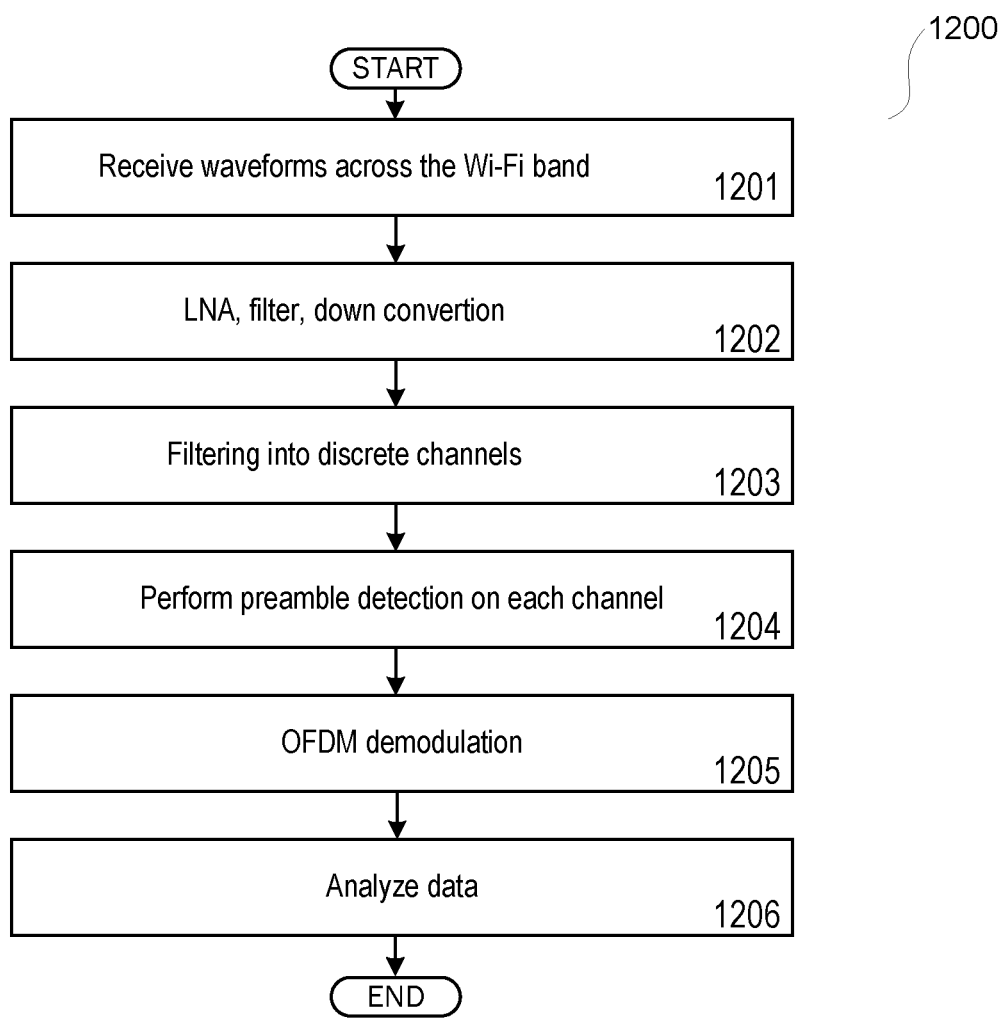
FIG. 12 is a flowchart of the steps for an example network traffic analysis of signals in the Wi-Fi band using the network traffic analyzer.

FIG. 12 is a flowchart 1200 of the steps for an example network traffic analysis of signals in the Wi-Fi band using the network traffic analyzer 1000. At step 1201 waveforms across the entire Wi-Fi band of interest may be received via antenna 1001. For example, signals over the entire 5 GHz band used by Wi-Fi may be received by the wideband front end 1002. In step 1202 the received signals may be amplified, filtered and I/Q frequency down converted. The functions of low noise amplification, filtering and down conversion may be accomplished by the wideband front end 1002. In step 1203 the wideband down converted signal may be filtered into discrete channels corresponding to the Wi-Fi bands' channelization. This channelization filtering may be performed by the RF Channelizer 1003. In step 1204, for each channel, OFDM preamble detection is carried out and if a preamble is detected, the waveform, in step 1205, is passed to a corresponding OFDM receiver. The preamble detection may take place in the OFDM preamble detection block 1005. In step 1205 the Wi-Fi OFDM functions of I/Q demodulation, guard interval removal, FFT (fast Fourier transform), pilot removal, de-interleaving, de-mapping, decoding, and descrambling and demodulating are performed. These functions may be carried out by each of the OFDM receivers in OFDM receiver block 1010. Finally, in step 1206, the demodulated data may be analyzed. This data analysis may be undertaken by the data analyzer block 1020.

Figure 13:
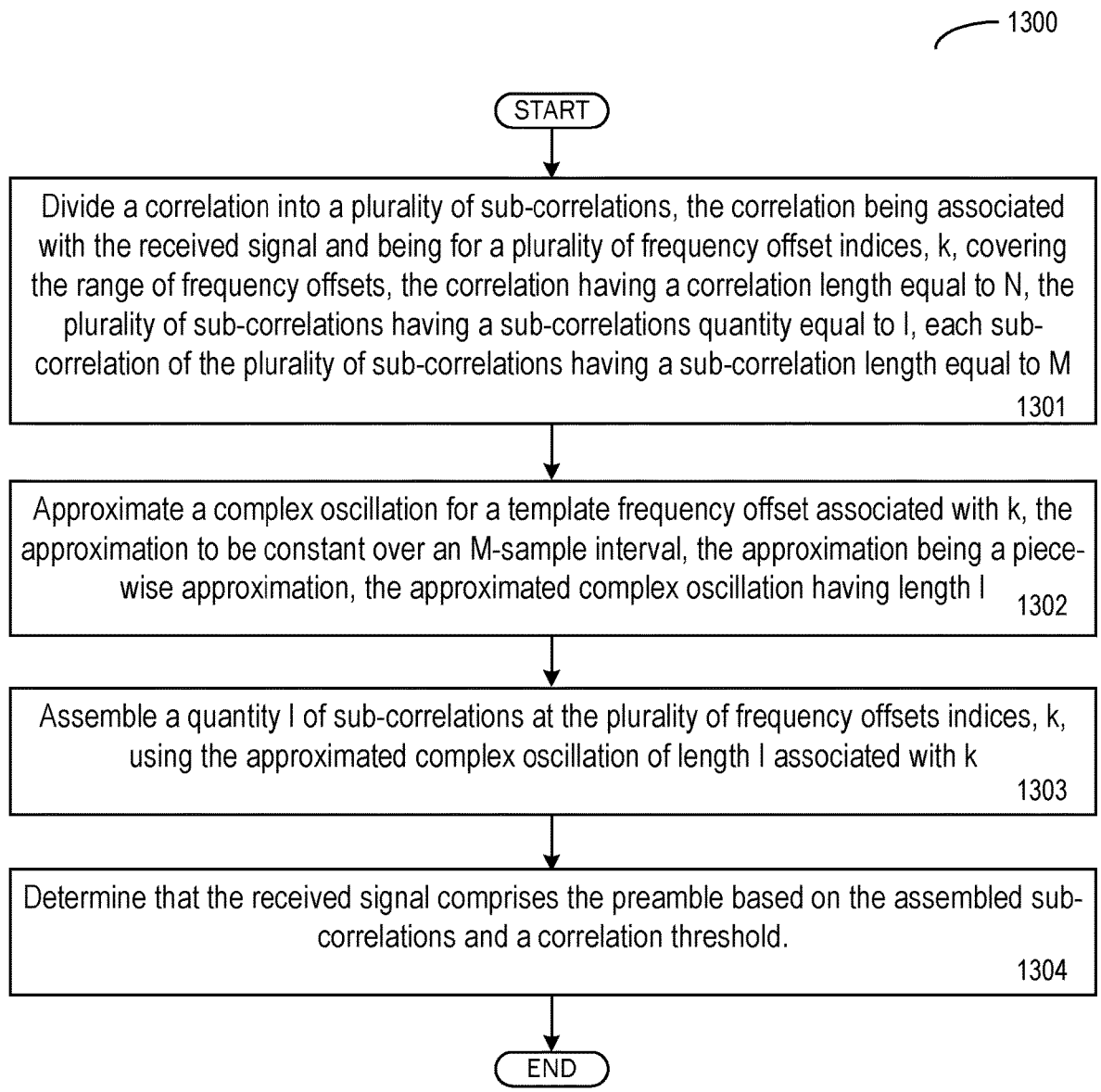
FIG. 13 is a flowchart of an example method in a correlator bank device.

FIG. 13 shows a flowchart of an example method in a correlator bank device 900. method for detecting a preamble waveform of a received signal over a range of frequency offsets is described. The received signal includes a preamble having a preamble length (N) corresponding to the total number of complex samples in the preamble. The preamble includes a plurality of waveforms that has a quantity (I) of waveforms in a sequence, where each waveform has a quantity (M) of samples. The method includes dividing a correlation into a plurality of sub-correlations. The correlation is associated with the received signal and is for a plurality of frequency offset indices (k) covering the range of frequency offsets. The correlation has a correlation length equal to N, the plurality of sub-correlations has a sub-correlations quantity equal to I, and each sub-correlation of the plurality of sub-correlations has a sub-correlation length equal to M. The method further includes approximating a complex oscillation for a template frequency offset associated with k. The approximation is to be constant over an M-sample interval and is a piece-wise approximation. The approximated complex oscillation has length I. The method also includes assembling a quantity I of sub-correlations at the plurality of frequency offsets indices (k) using the approximated complex oscillation of length I associated with k and determining that the received signal includes the preamble based on the assembled sub-correlations and a correlation threshold.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the frequency step offset value, the sampling frequency, the quantizing details and method, the order and details of the multiplexing, the method and/or limit to declare a preamble detection, the use of length-32 and length 64 correlators. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings and following claims.

What is claimed is:

1. A method for detecting a preamble waveform of a received signal over a range of frequency offsets, the received signal comprising a preamble, the preamble having a preamble length corresponding to a plurality of complex samples in the preamble, the preamble comprising a plurality of waveforms in a sequence, each waveform having a plurality of samples, the method comprising:

dividing a correlation into a plurality of sub-correlations, the correlation being associated with the received signal and being for a plurality of frequency offset indices covering the range of frequency offsets, the correlation having a fixed correlation length and each sub-correlation of the plurality of sub-correlations having a fixed sub-correlation length;

approximating a complex oscillation for a template frequency offset associated with the plurality of frequency offset indices, the approximation to be constant over the fixed sub-correlation length, the approximation being a piece-wise approximation, the approximated complex oscillation having a length equal to the number of waveforms in the plurality of waveforms;

assembling a quantity of sub-correlations at each frequency offset index of the plurality of frequency offset indices using the approximated complex oscillation; and determining that the received signal comprises the preamble based on the assembled sub-correlations and a correlation threshold.

2. The method of claim 1, wherein, for a given sample rate, the fixed sub-correlation length is determined based on a predetermined level of signal energy loss due to the piece-wise approximation.

3. The method of claim 2, wherein a signal energy loss of a waveform of the plurality of waveforms at a frequency offset, f, due to the piece-wise approximation is:

$$-10\log_{10}\left\{\frac{\sin(\pi M f_1/f_s)}{\sin(\pi f_1/f_s)} \cdot \frac{\sin[\pi \Delta_{min}(f_1)/f_s]}{\sin[\pi M \Delta_{min}(f_1)/f_s]}\right\}^2$$

M being a quantity of the plurality of samples of the waveform;

$f_1$ being a maximum expected 1-sided received frequency offset;

$f_s$ being the given sample rate; and $\Delta_{min}(f)$ being a frequency distance from f to a nearest correlator bank frequency offset among a set of correlator bank frequency offsets.

4. The method of claim 3, wherein $\Delta_{min}(f)$ is expressed as:

$\Delta_{min}(f) = \min_{k \in} K$ (|f−f_k|)

K being a set of frequency offset indices;

k being a frequency offset index from K;

$f_k$ being correlator bank offset frequencies expressed as:

$f_k = \Delta f \cdot k$, for $k \in [-K_1, +K_1]$

Δf being a uniform frequency spacing between the correlator bank offset frequencies; and $K_1$ being the number of correlator bank offset frequencies on each side of 0 Hz.

5. The method of claim 4, wherein:

$\Delta f = f_s/N$

N being a quantity of the plurality of complex samples in the preamble.

6. The method of claim 1, wherein assembling the quantity of sub-correlations is performed using a Fast Fourier Transform (FFT) in conjunction with a frequency bin de-mapping function.

7. The method of claim 5, wherein the correlation is performed using a correlator, for detecting an orthogonal frequency division multiplex (OFDM) long preamble, that uses only two sub-correlators, each of fixed sub-correlation length M, with at least one delay, the correlator having the following parameters:

5 sub-correlations;

sub-correlation length M=32;

N=160;

sample rate $f_s$=20 MHz; and maximum 1-sided frequency offset $f_1$=116.5 kHz.

8. The method of claim 7, wherein the parameters further include:

Δf=78125 Hz;

and $K_1$=1.

9. The method of claim 8, for k=−1, 0, and 1, the correlation having N=160 is performed using a plurality of sums from outputs of one or both of the sub-correlators and the at least one delay, the plurality of sums being expressed as:

$$y_n^{(160,k)} \approx \sum_{i=0}^{4} e^{-j\pi ki/4} \cdot y_{n-160[1-(i+1)/5]}^{(32,0,i)}$$

resulting in assembler phasors that are either $\pm 1$, $\pm j$, $(1\pm j)/\sqrt{2}$, or $(-1\pm j)/\sqrt{2}$; and $y_n^{(160,k)}$ corresponding to the assembled sub-correlations for each k.

10. The method of claim 9, wherein the correlation threshold is a preset correlation level, and determining that the received signal comprises the preamble includes:
   determining a correlation peak associated with the received signal is above the preset correlation level corresponding to $y_n^{(160,k)}$.

11. A correlator apparatus configured for detecting a preamble waveform of a received signal over a range of frequency offsets, the received signal comprising a preamble, the preamble having a preamble length corresponding to a plurality of complex samples in the preamble, the preamble comprising a plurality of waveforms in a sequence, each waveform having a plurality of samples, the correlator apparatus comprising processing circuitry configured to:
   divide a correlation into a plurality of sub-correlations, the correlation being associated with the received signal and being for a plurality of frequency offset indices covering the range of frequency offsets, the correlation having a fixed correlation length and each sub-correlation of the plurality of sub-correlations having a fixed sub-correlation length;
   approximate a complex oscillation for a template frequency offset associated with the plurality of frequency offset indices, the approximation to be constant over the fixed sub-correlation length, the approximation being a piece-wise approximation, the approximated complex oscillation having a length equal to the number of waveforms in the plurality of waveforms;
   assemble a quantity of sub-correlations at each frequency offset index of the plurality of frequency offset indices using the approximated complex oscillation; and
   determine that the received signal comprises the preamble based on the assembled sub-correlations and a correlation threshold.

12. The correlator apparatus of claim 11, wherein, for a given sample rate, the fixed sub-correlation length is determined based on a predetermined level of signal energy loss due to the piece-wise approximation.

13. The correlator apparatus of claim 12, wherein a signal energy loss of a waveform of the plurality of waveforms at a frequency offset, f, due to the piece-wise approximation is:

$$-10\log_{10}\left\{\frac{\sin(\pi M f_1/f_s)}{\sin(\pi f_1/f_s)} \cdot \frac{\sin[\pi \Delta_{min}(f_1)/f_s]}{\sin[\pi M \Delta_{min}(f_1)/f_s]}\right\}^2$$

M being a quantity of the plurality of samples of the waveform;
$f_1$ being a maximum expected 1-sided received frequency offset; and
$f_s$ being the given sample rate; and
$\Delta_{min}(f)$ being a frequency distance from f to a nearest correlator bank frequency offset among a set of correlator bank frequency offsets.

14. The correlator apparatus of claim 13, wherein $\Delta_{min}(f)$ is expressed as:

$\Delta_{min}(f) = \min_{k \in K}(|f - f_k|)$

K being a set of frequency offset indices;
k being a frequency offset index from K;

$f_k$ being correlator bank offset frequencies expressed as:

$f_k = \Delta f \cdot k$, for $k \in [-K_1, +K_1]$ $\Delta f$ being a uniform frequency spacing between the correlator bank offset frequencies; and
$K_1$ being the number of correlator bank offset frequencies on each side of 0 Hz.

15. The correlator apparatus of claim 4, wherein:

$\Delta f = f_s/N$

N being a quantity of the plurality of complex samples in the preamble.

16. The correlator apparatus of claim 11, wherein assembling the quantity of sub-correlations is performed using a Fast Fourier Transform (FFT) in conjunction with a frequency bin de-mapping function.

17. The correlator apparatus of claim 15, wherein the correlation is performed using a correlator, for detecting an orthogonal frequency division multiplex (OFDM) long preamble, that uses only two sub-correlators, each of fixed sub-correlation length M, with at least one delay, the correlator having the following parameters:
   5 sub-correlations;
   sub-correlation length M=32;
   N=160;
   sample rate $f_s$=20 MHz; and
   maximum 1-sided frequency offset $f_1$=116.5 kHz.

18. The correlator apparatus of claim 17, wherein the parameters further include:
   $\Delta f$=78125 Hz; and
   $K_1$=1.

19. The correlator apparatus of claim 18, for k=−1, 0, and 1, the correlation having N=160 is performed using a plurality of sums from outputs of one or both of the sub-correlators and the at least one delay, the plurality of sums being expressed as:

$$y_n^{(160,k)} \approx \sum_{i=0}^{4} e^{-j\pi k i/4} \cdot y_{n-160[1-(i+1)/5]}^{(32,0,i)}$$

resulting in assembler phasors that are either $\pm 1$, $\pm j$, $(1\pm j)/\sqrt{2}$, or $(-1\pm j)/\sqrt{2}$; and $y_n^{(160,k)}$ corresponding to the assembled sub-correlations for each k;
the correlation threshold being a preset correlation level; and
determining that the received signal comprises the preamble includes determining a correlation peak associated with the received signal is above the preset correlation level corresponding to $y_n^{(160,k)}$.

20. A system, the system comprising a correlator apparatus configured for detecting a preamble waveform of a received signal over a range of frequency offsets, the received signal comprising a preamble, the preamble having a preamble length corresponding to a plurality of complex samples in the preamble, the preamble comprising a plurality of waveforms in a sequence, each waveform having a plurality of samples, the correlator apparatus comprising processing circuitry configured to:
   divide a correlation into a plurality of sub-correlations, the correlation being associated with the received signal and being for a plurality of frequency offset indices covering the range of frequency offsets, the correlation having a fixed correlation length and each sub-correlation of the plurality of sub-correlations having a fixed sub-correlation length;

approximate a complex oscillation for a template frequency offset associated with the plurality of frequency offset indices, the approximation to be constant over the fixed sub-correlation length, the approximation being a piece-wise approximation, the approximated complex oscillation having a length equal to the number of waveforms in the plurality of waveforms;

determine, for a given sample rate, $f_s$, the fixed sub-correlation length based on a predetermined level of signal energy loss due to the piece-wise approximation;

assemble a quantity of sub-correlations at each frequency offset index of the plurality of frequency offset indices using the approximated complex oscillation; and determine that the received signal comprises the preamble based on the assembled sub-correlations and a correlation threshold.

* * * * *